(12) United States Patent
Zhang et al.

(10) Patent No.: US 7,624,035 B2
(45) Date of Patent: Nov. 24, 2009

(54) EXTRACTING AN IMPLIED VALUE OF A COMPONENT ASSOCIATED WITH A PLURALITY OF PRODUCT PACKAGES

(75) Inventors: Alex X. Zhang, San Jose, CA (US); Dirk Beyer, Walnut Creek, CA (US); Kemal Guler, Cupertino, CA (US); Hsiu-Khuern Tang, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1386 days.

(21) Appl. No.: 10/360,451

(22) Filed: Feb. 5, 2003

(65) Prior Publication Data
US 2004/0153331 A1    Aug. 5, 2004

(51) Int. Cl.
G06F 17/50    (2006.01)

(52) U.S. Cl. .......................................................... 705/7

(58) Field of Classification Search ...................... 705/7
See application file for complete search history.

(56) References Cited

U.S. PATENT DOCUMENTS

| | | | | |
|---|---|---|---|---|
| 5,539,652 | A * | 7/1996 | Tegethoff | 703/14 |
| 7,013,285 | B1 * | 3/2006 | Rebane | 705/10 |
| 7,567,917 | B2 * | 7/2009 | Miller et al. | 705/10 |

OTHER PUBLICATIONS

Y. Li et al "Design Factors and Their Effect on PCB Assembly Yield-Statistical and Neural Network Predictive Models"., Jun. 1994, IEEE transactions on components, packaging, and manufacturing technology-Part A, vol. 17, No. 2, pp. 183-191.*
Christodoulos (Quadratic Optimization), Department of Chemical Engineering, pp. 1-53.*

* cited by examiner

Primary Examiner—Bradley Bayat (57) ABSTRACT

A method for extracting an implied value of a component associated with a plurality of product packages is disclosed. One embodiment of the method includes receiving data associated with a plurality of product packages. It is noted that the data comprises product package price data associated with the plurality of product packages. The data is processed utilizing a mathematical optimization to produce first output data. The first output data is processed with a statistical regression to produce second output data. The second output data includes an estimated value and its standard error of a component associated with the plurality of product packages.

27 Claims, 5 Drawing Sheets

| Product ID 202 | Product Price 204 | Processor ID 206 | HDD 208 | Screen Size 210 | Units Sold 212 |
|---|---|---|---|---|---|
| 1 | $2000 | Pentium III 800 MHz | 20 GB | 15 in. | 110 |
| 2 | $1500 | Pentium III 700 MHz | 20 GB | 15 in. | 20 |
| 3 | $1100 | Pentium III 700 MHz | 15 GB | 14 in. | 52 |
| 4 | $1000 | Pentium III 500 MHz | 10 GB | 14 in. | 36 |
| 5 | $1200 | Pentium III 600 MHz | 15 GB | 14 in. | 40 |
| ••• | ••• | ••• | ••• | ••• | ••• |
| N | $1300 | Pentium III 600 MHz | 20 GB | 15 in. | 45 |

EXTRACTING AN IMPLIED VALUE OF A COMPONENT ASSOCIATED WITH A PLURALITY OF PRODUCT PACKAGES

BACKGROUND ART

Computers have become integral tools used in a wide variety of different applications, such as in finance and commercial transactions, computer-aided design and manufacturing, health care, telecommunication, education, etc. Computers are finding new applications as a result of advances in hardware technology and rapid development in software technology. Furthermore, the functionality of a computer system is dramatically enhanced by coupling these types of stand-alone devices together in order to form a networking environment.

It is understood that computer products such as laptop (notebook) computers and desktop computers are configurable products that may include a wide variety of interchangeable components. For example, the interchangeable computer components may include microprocessors of varying operating speeds, hard drives of different memory capacities, and optical drives of different disc formats such as compact disc (CD), CD-ReWriteable (CD-RW), digital versatile disc (DVD) or Combination, to name a few. Therefore, a computer may be considered a product package that encompasses a combination of components.

It is desirable for product managers and designers of computer systems to know the implicit price or value that their customers place on each component or product feature of their computer packages. One conventional solution for obtaining the implied component prices is to utilize surveys or questionnaires with computer customers. However, there are disadvantages associated with this conventional solution. For example, utilizing surveys or questionnaires can be costly to implement, can be time consuming, and often contain subjective biases which can be due to the small sample nature of the process.

Another conventional solution for obtaining the implied component prices of computer systems is to utilize the Hedonic Price Analysis approach proposed by economists. However, this conventional solution also has disadvantages associated with it. For example, the Hedonic Price Analysis might produce counterintuitive results, such as a slower processor to have a higher implicit price value than a faster processor, due to statistical variations and errors, which may cause those unfamiliar with statistical methodology, such as product managers and designers, to distrust this approach.

A third conventional solution for obtaining the implied component prices of computer systems is to utilize the Bayesian based approaches for Hedonic Price Analysis. But there are disadvantages associated with them as well. For example, these approaches are heavily mathematics/statistics oriented, involving sophisticated modeling, and apply to certain areas of applications. More importantly, these approaches can also produce counterintuitive results which may cause those unfamiliar with statistical methodology to distrust these approaches.

The present invention may address one or more of the above issues.

SUMMARY OF THE INVENTION

A method for extracting an implied value of a component associated with a plurality of product packages is disclosed. One embodiment of the method includes receiving data associated with a plurality of product packages. It is noted that the data comprises product package price data associated with the plurality of product packages. The data is processed utilizing a mathematical optimization to produce first output data. The first output data is processed with a statistical regression to produce second output data. The second output data includes an estimated value and its standard error of a component associated with the plurality of product packages.

DESCRIPTION OF PREFERRED EMBODIMENTS

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the present invention.

Exemplary Operations in Accordance with the Present Invention

Figure 1:
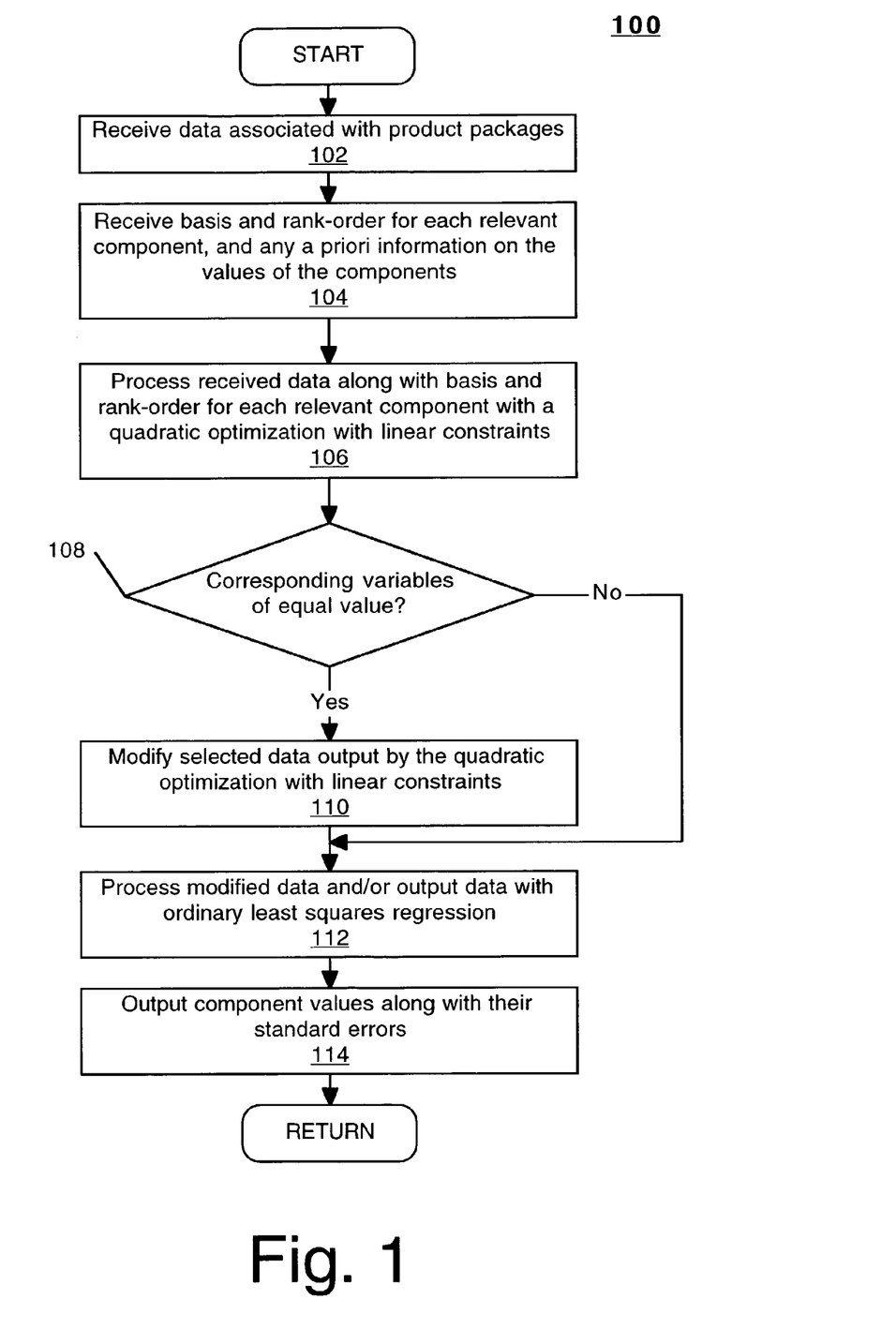
FIG. 1 is a flowchart of steps performed in accordance with an embodiment of the present invention for extracting implied values of components associated with a plurality of product packages.

FIG. 1 is a flowchart 100 of steps performed in accordance with an embodiment of the present invention for extracting implied values of components associated with a plurality of product packages. Flowchart 100 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 100, such steps are exemplary. That is, the present embodiment is well suited to performing various other steps or variations of the steps recited in FIG. 1.

Within the present embodiment, it should be appreciated that the steps of flowchart 100 may be performed by software, by hardware or by any combination of software and hardware.

For configurable products such as notebook (laptop) and desktop computers, interchangeable components are packaged together in order to form different product packages or Stock Keeping Units (SKUs). For example, the interchangeable components of computer systems may include microprocessors of varying speeds, hard drives of different capacities, or optical drives of different disc formats such as CD, CD-RW, DVD or Combination. As such, a product package may be considered a combination of components. It is noted that it is desirable for product managers and designers to know the implicit price or value that their customers place on each component or product feature. The present embodiment provides a method to extract the implied prices or values of the components (or features) that form a plurality of product packages, from the product package prices and sales data.

For example, raw data associated with product packages is received for each relevant component of the packages. The raw data may include, but is not limited to, the price associated with each product package and its associated components and specifications. Then a user may enter his or her comparison basis and rank orders of these components. The product raw data along with the basis and rank-order for each relevant component are then processed with a quadratic optimization with linear constraints. If corresponding variables of the resulting output data are equal, they may be combined thereby modifying the output data. The modified output data and/or the output data from the quadratic optimization is processed with an ordinary least squares regression. As a result of this processing, component values along with their standard errors or deviations are produced. In this manner, implied values of components associated with a plurality of packages is extracted or determined.

Figure 2:
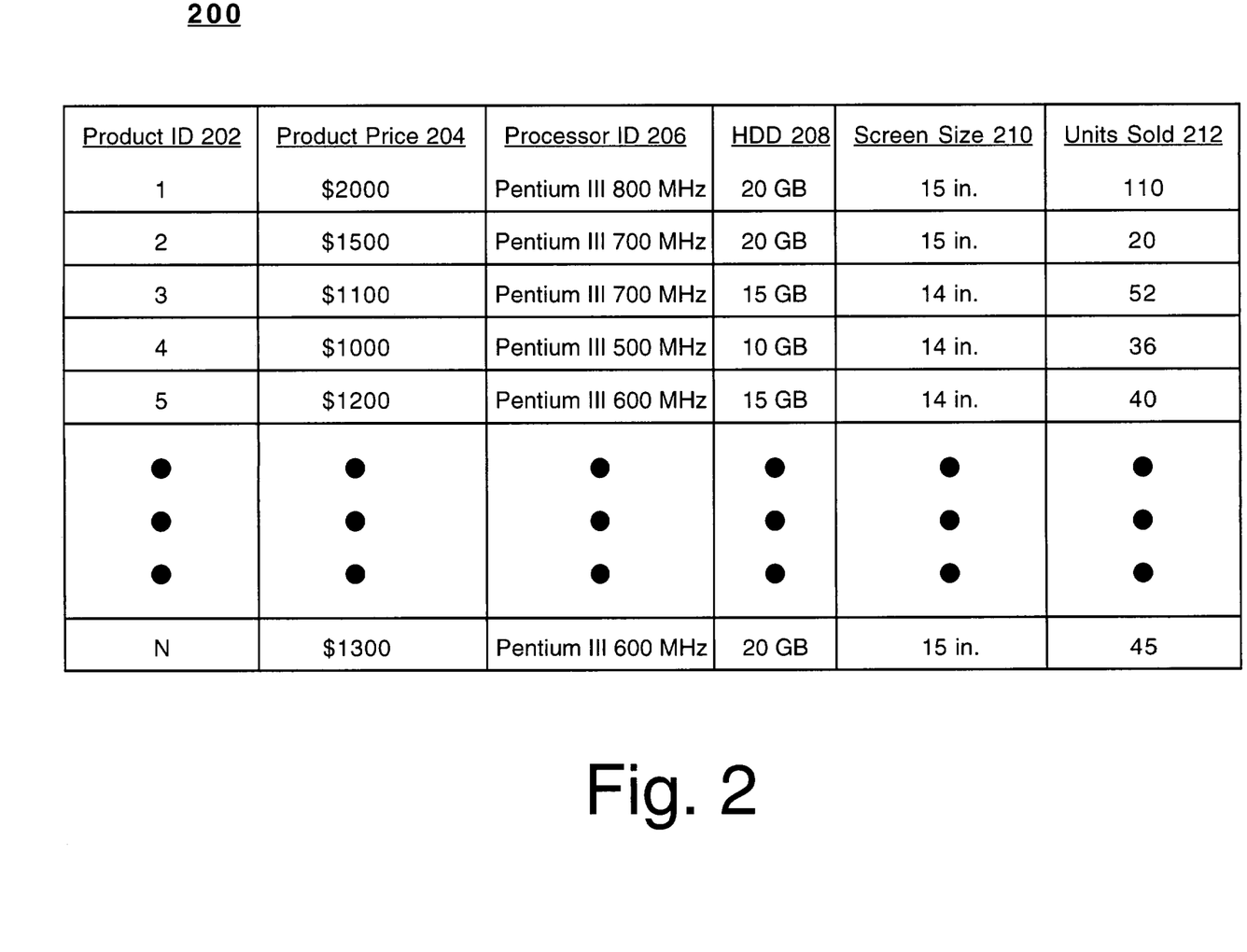
FIG. 2 is an exemplary spreadsheet including sample raw data in accordance with an embodiment of the present invention.

It is noted that FIG. 1 is described in conjunction with FIG. 2 in order to provide a more thorough understanding of flowchart 100. At step 102 of FIG. 1, raw data associated with a plurality of product packages is received in order to be processed by flowchart 100. The raw data may be received at step 102 by software and/or hardware associated with a computer system (e.g., 500 of FIG. 5). It is noted that the plurality of product packages may include a wide variety of product packages. For example, each product package may be, but is not limited to, a configurable product package such as a notebook (laptop) computer, desktop computer, server computer, portable computing device, etc. Additionally, the raw data of the present embodiment may include, but is not limited to, the price associated with each product package, components and/or specifications of each product package, and product unit sales volumes (e.g., from a historical record). It is understood that the raw data may be received at step 102 in diverse formats. For example, the raw data may be received in a column and row format similar to a spreadsheet format.

FIG. 2 is an exemplary spreadsheet 200 in accordance with an embodiment of the present invention that includes sample raw data associated with a variety of notebook computers. It is appreciated that these notebook computers may include different brands such as Hewlett-Packard (HP), Compaq, IBM, Sony, Toshiba, Apple, etc. Spreadsheet 200 may include columns such as "Product Identifier (ID)" 202, "Product Price" 204, "Processor ID" 206, "Hard Disk Drive (HDD)" 208, "Screen Size" 210 and "Units Sold" 212. It is appreciated that each row associated with a product ID underneath Product ID 202 corresponds to a notebook computer (or product package). For example, product 1 corresponds to a notebook computer including a product price of $2000, an Intel Pentium III 800 megahertz (MHz) microprocessor, a 20 gigabyte (GB) hard drive, a screen size of 15 inches (in.), and 100 units sold.

Moreover, product 2 corresponds to a different notebook computer including a product price of $1500, a Pentium III 700 MHz microprocessor, a 20 GB hard drive, a screen size of 15 in., and 20 units sold. It is understood that spreadsheet 200 may include raw data corresponding to any number of notebook computers and may be modified to include raw data for any type of product package. That is, spreadsheet 200 of the present embodiment is not in any way limited to include raw data associated with notebook computers.

At step 104 of FIG. 1, a comparison basis and rank-order constraints for each relevant component of the product packages are received in order to be processed in combination with the raw data received at step 102. It is noted that the basis for a relevant component may be set in order to subsequently provide the comparison basis by which the value of each variation of that component is relative to.

For example, utilizing the raw data shown within spreadsheet 200 (FIG. 2), the Pentium III 500 MHz processor may be the basis by which the value of each of the other processors are measured against. Furthermore, the 10 GB hard drive may be the basis by which the value of each of the other hard drives are relative to. It is appreciated that when setting a basis for a particular component (e.g., screen size), the least valuable component (e.g., 14 in.) may be set as the basis so that the value of each variation of that component has a positive value. However, the basis for a specific component may be set at a mid-level component or at the most valuable component. In this manner, some of the values of the variations of that component may subsequently result in having a negative value compared to the basis.

It is noted that the rank-order constraints for each relevant component of the product packages of step 104 provide value constraints among the variations of the same type of component. For example, it is typically understood that a microprocessor that operates at a higher frequency is more valuable than one that operates at a lower frequency. As such, a rank-order for processors may define the value associated with the Pentium III 500 MHz processor is less than or equal to the value associated with the Pentium III 600 MHz processor. Additionally, a different rank-order constraint may define the value associated with the Pentium III 600 MHz processor is less than or equal to the value associated with the Pentium III 700 MHz processor. Furthermore, an additional rank-order constraint may define the value associated with the Pentium III 700 MHz processor is less than or equal to the value associated with the Pentium III 800 MHz processor. By utilizing rank-order constraints for each relevant component in this manner, process 100 does not produce component values that are counterintuitive. It is noted that the rank-order constraints for each relevant component may be considered mathematical constraints for the raw data of process 100.

Within one embodiment of step 104, rank order constraints may be expressed in sequence numbers, such as "1" for the value of the Pentium III 500 MHz processor and "2" for the value of the Pentium III 600 MHz processor thereby indicating that the value of the Pentium III 500 MHz processor is less than or equal to the value of the Pentium III 600 MHz processor. In addition, the user may also enter a priori knowledge or rules such as "the value of a 600 MHz processor should both exceed $400 relative to the comparison basis which is a 500 MHz processor", and/or "the value difference between the 700 MHz processor and the 600 MHz processor should be no greater than the value difference between a 20 GB hard drive and a 10 GB hard drive."

In step 106 of FIG. 1, the raw data on product packages, along with basis, rank-orders, and any a priori knowledge or rules for each relevant component, is processed with a quadratic optimization with linear constraints. In particular, the rank-orders such as "component 1 value is ranked at or below component 2 value" may be translated into linear inequality constraints such as "b1≦b2", the a priori knowledge about the bound on the component value may be translated into linear inequality constraints such as "b2≦400", the a priori knowledge about the incremental values of different categories of components may be translated into linear inequality constraints such as "b2−b1≦b9−b8", where b1, b2, etc. are the values associated with various components. The objective function in the quadratic optimization may be the sum of squares of the residuals, where the residual is the difference between the sales price of a product package and the predicted value of the product package using the coefficients b0, b1, b2, etc. of the regression equation, described with reference to step 112. The regression equation for the prediction of the product package value may be linear, or may be non-linear involving non-linear transformations or cross-product (interaction) terms which may be used to represent a priori knowledge such as "the contribution of processor speed in MHz to the product package value is greater when a high-capacity hard drive is also present in the same package."

It is understood that the quadratic optimization with linear constraints may be implemented in a wide variety of ways in accordance with the present embodiment. For example, the quadratic optimization with linear constraints may be performed by utilizing, but is not limited to, Microsoft® Excel, the General Algebraic Modeling System (GAMS), AMPL® which is a mathematical programming language, or a custom-coded numerical optimization sub-routine in C or C++. It is appreciated that the quadratic optimization with linear constraints produces the value of each component variation of the product package. The value of each component variation may be equal to a rank-order coefficient (e.g., b0, b1, b2 . . . etc.) or variable.

It is understood that the quadratic optimization with linear constraints may be used to determine which components have equal values while still satisfying the rank orders and a priori knowledge and rules. The quadratic objective function corresponds to the sum of the squared residuals of the regression equation described with reference to step 112. Those components that have equal values will be combined and merged by modifying the raw data, as described with reference to steps 108 and 110. The resulting modified data, when processed with an ordinary least squares (OLS) regression as described with reference to step 112, will produce a set of regression coefficients that reflect the rank orders and a priori knowledge and rules.

At step 108, a determination is made as to whether two or more of the corresponding component variables (e.g., rank-order coefficients) have an equal value. If not, the present embodiment proceeds to step 112. However, if two or more of the corresponding component variables (e.g., rank-order coefficients) have an equal value at step 108, the present embodiment proceeds to step 110.

At step 110, the output data associated with the two or more corresponding component variables (e.g., rank-order coefficients) is modified. It is noted that the output data may be modified in a wide variety of ways in accordance with the present embodiment. For example, the component identifier corresponding to each variable may be combined or merged by providing a common component identifier for each of them. In this manner, corresponding components having the same value are regarded as the same component since there is no differentiation between their values. It is noted that by performing this type of modification to the output data, process 100 avoids producing component values that are counterintuitive.

In step 112 of FIG. 1, the modified data and/or the output data of the quadratic optimization with linear constraints is then processed with an ordinary least squares (OLS) regression. It is noted that the ordinary least squares regression may be implemented in a wide variety of formats. For example, the ordinary least squares regression may be represented by the following exemplary relationship:

$$\text{Price}(i,t) = b0 + b1^*\text{Brand1}(i) + b2^*\text{Brand2}(i) + b3^*\text{Brand3}(i) + b4^*\text{Processor1}(i) + b5^*\text{Processor2}(i) + b6^*\text{Processor3}(i) + b7^*\text{Processor4}(i) + b8^*\text{HDD1}(i) + b9^*\text{HDD2}(i) + b10^*t$$

wherein "i" is an index for product package, "t" is an index for time period (e.g., month or week), Brand1(i) is a dummy variable (taking two possible values of 0 or 1) indicating whether product package i is of Brand1; Processor1(i) is a dummy variable indicating whether product package i is of a particular processor (type and speed, such as Pentium III 800 MHz); etc. It is noted that the unknown coefficient "b1" would therefore represent the value of Brand1 while the unknown coefficient "b4" would therefore represent the value of Processor1. The ordinary least squares regression procedure yields the estimated values of these components or product features. To reflect the differing amounts of influence on component values by successful and unsuccessful product package configurations, a unit volumes v(i,t) of the product packages may be utilized as weights to the least squares regression.

At step 114, the ordinary least squares regression reproduces the numerical values of the coefficients (e.g., b0, b1, b2 . . . etc.) along with their standard errors. It is appreciated that the regression coefficients represent the estimated value of each component with respect to its corresponding component basis. It is noted that the standard errors of the regression coefficients may also be referred to as the standard deviations of the regression coefficients. Once step 114 is completed, the present embodiment exits flowchart 100.

It is noted that process 100 of FIG. 1 may be useful in a wide variety of statistical and economic analyses. Additionally, it is appreciated that process 100 avoids producing counterintuitive results while not being time consuming and costly to implement.

Figure 3:
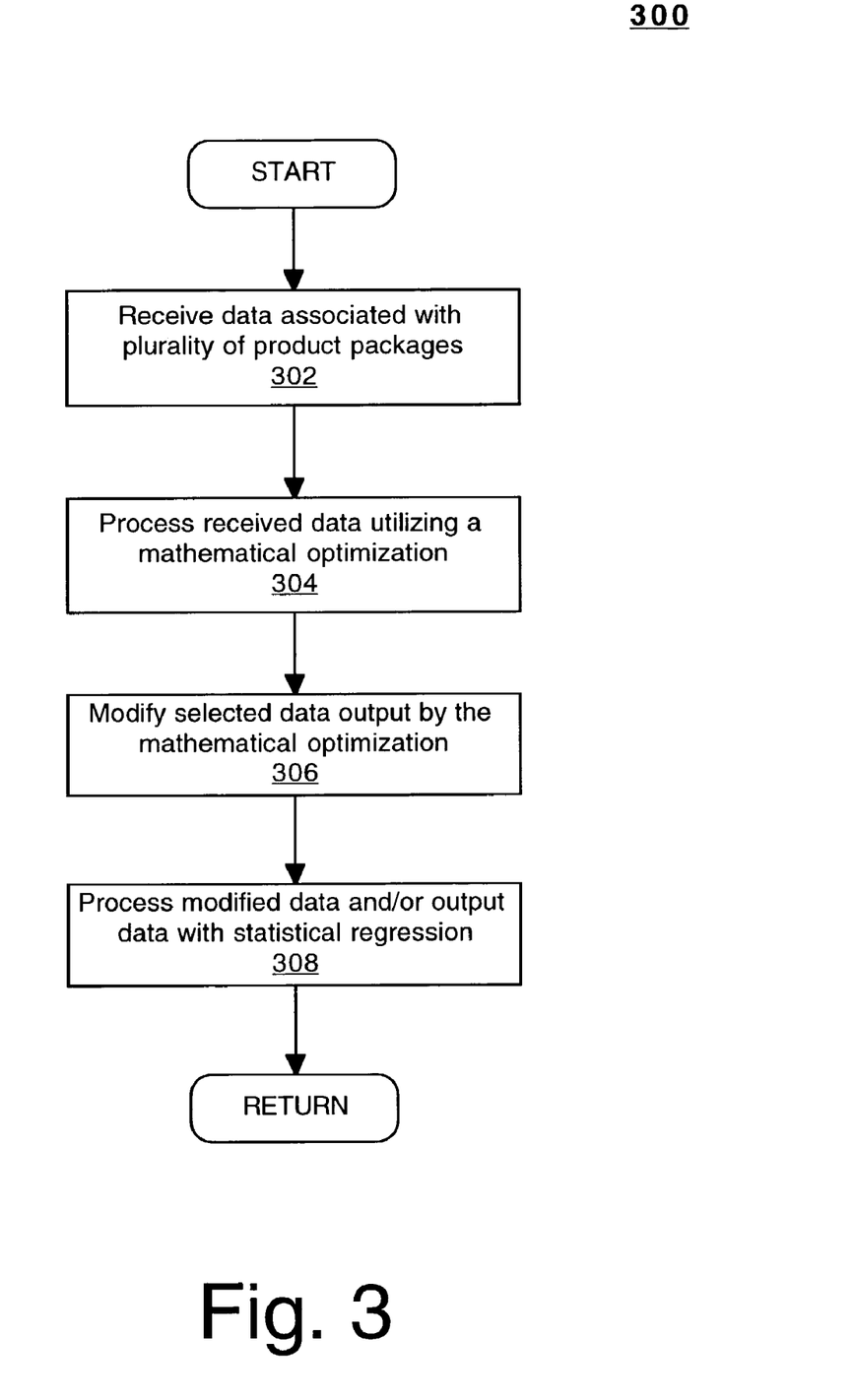
FIG. 3 is a flowchart of steps performed in accordance with another embodiment of the present invention for extracting implied values of components associated with a plurality of product packages.

FIG. 3 is a flowchart 300 of steps at a more aggregate level performed in accordance with an embodiment of the present invention for extracting implied values of components associated with a plurality of product packages. Flowchart 300 includes processes which, in some embodiments, are carried out by a processor(s) and electrical components under the control of computer readable and computer executable instructions. The computer readable and computer executable instructions may reside, for example, in data storage features such as computer usable volatile memory, computer usable non-volatile memory and/or computer usable mass data storage. However, the computer readable and computer executable instructions may reside in any type of computer readable medium. Although specific steps are disclosed in flowchart 300, such steps are exemplary. That is, the present embodiment is well suited to performing various other steps or variations of the steps recited in FIG. 3. Within the present embodiment, it should be appreciated that the steps of flowchart 300 may be performed by software, by hardware or by any combination of software and hardware.

For example, data associated with a plurality of product packages is received. The received data is processed with a mathematical optimization to produce output data. The output data may then be modified in preparation for being input into a statistical regression. The modified output data and/or the output data from the mathematical optimization is processed with the statistical regression. As a result of this processing, the component values along with their standard errors or deviations are produced. In this manner, the implied values of the components associated with the plurality of packages are extracted or determined.

At step 302 of FIG. 3, data associated with a plurality of product packages is received in order to be processed by flowchart 300. The data may be received at step 302 by software and/or hardware associated with a computer system (e.g., 500 of FIG. 5). The received data may include, but is not limited to, price data associated with the plurality of product packages, the product package unit sales volumes (e.g., from a historical record), components and/or specifications of each product package, one or more comparison basis associated with the components of the packages, and/or a rank-order associated with the components. It is noted that the plurality of product packages may include a wide variety of product packages. For example, each product package may be, but is not limited to, a configurable product package such as a notebook (laptop) computer, desktop computer, server computer, portable computing device, etc. It is understood that the data may be received at step 302 in diverse formats in accordance with the present embodiment. For example, the data may be received in a column and row format similar to a spreadsheet format, as described herein but is not limited to such.

In step 304, the received data associated with the plurality of product packages is processed with a mathematical optimization. It is understood that the mathematical optimization of step 304 may be implemented in a wide variety of ways in accordance with the present embodiment. For example, the mathematical optimization may include, but is not limited to, quadratic optimization, quadratic optimization with linear constraints, non-linear optimization with constraints, and the like. It is further noted that the quadratic optimization or quadratic optimization with linear constraints may each be implemented in any manner similar to that described herein. However, the implementation of the quadratic optimization or quadratic optimization with linear constraints is not limited to such implementations. It is appreciated that the mathematical optimization may produce the value of each variation of the corresponding components of the product packages.

At step 306 of FIG. 3, the output data associated with corresponding component variables (e.g., rank-order coefficients) of equal value may be modified. It is noted that the output data may be modified in a wide variety of ways in accordance with the present embodiment. For example, the component identifier corresponding to each variable may be merged or combined by providing a common component identifier (or tag) for each of them. In this manner, corresponding components having the same value are regarded as the "same" component because there is no differentiation between their values. It is noted that by performing this type of modification to the output data, process 300 avoids generating component values that are counterintuitive.

In step 308, the modified data and/or the output data of the mathematical optimization is then processed with statistical regression. It is appreciated that the statistical regression of the present embodiment may be implemented in diverse ways. For example, the statistical regression may be implemented as an ordinary least squares (OLS) regression, and the like. It is noted that the OLS may be implemented in, but not limited to, any manner similar to that described herein. The statistical regression of step 308 produces the estimated values of the components (e.g., coefficients) along with their respective standard deviation or errors. It is understood that the estimated values of the components may represent the value with respect to their component basis. Once step 308 is completed, the present embodiment exits flowchart 300.

It is noted that process 300 of FIG. 3 may be useful in a wide variety of statistical and economic analyses. Additionally, it is appreciated that process 300 avoids producing counterintuitive results while not being time consuming and costly to implement.

Exemplary Network in Accordance with the Present Invention

Figure 4:
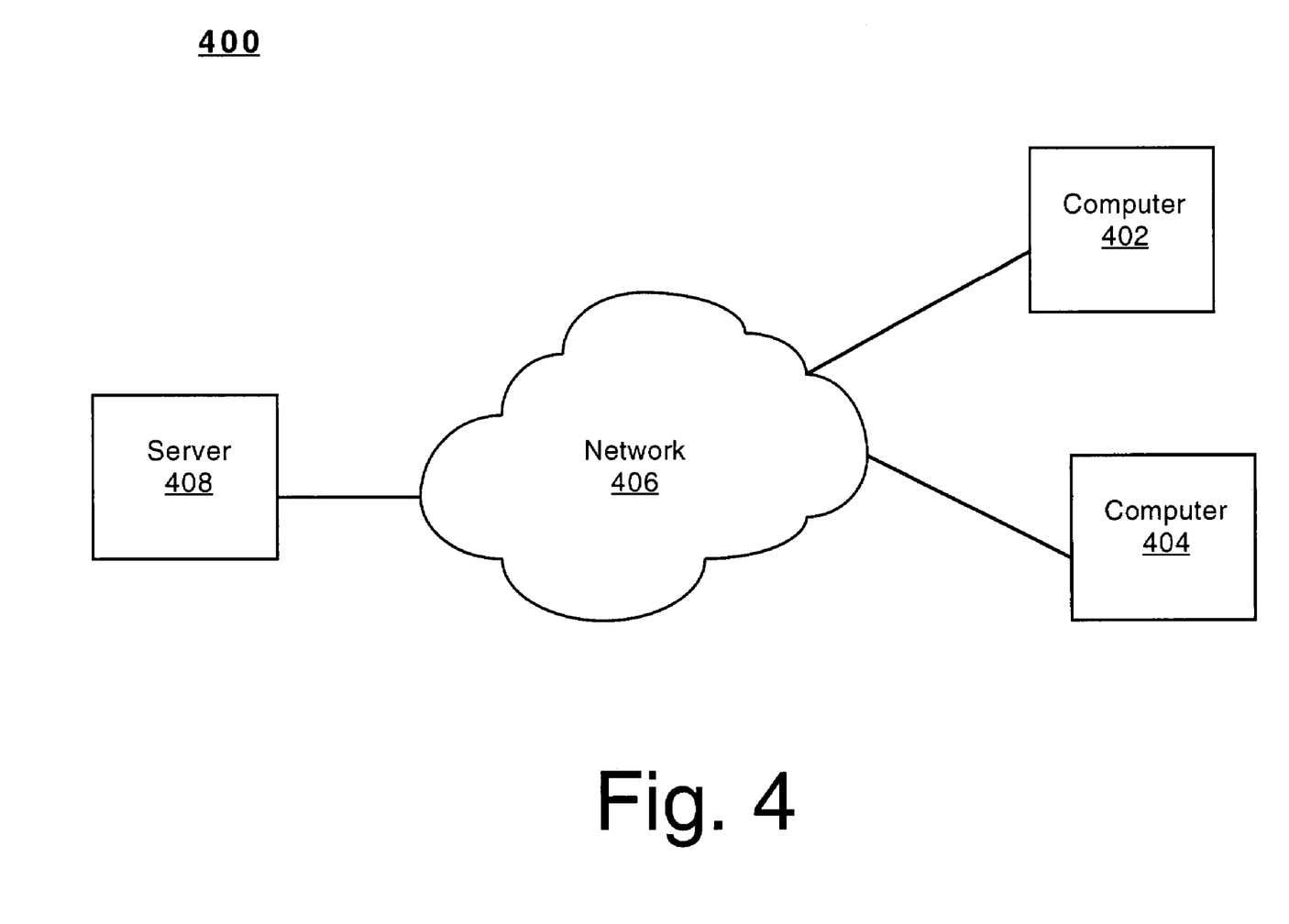
FIG. 4 is a block diagram of an exemplary network that may be utilized in accordance with embodiments of the present invention.

FIG. 4 is a block diagram of an exemplary network 400 that may be utilized in accordance with embodiments of the present invention. For example, computers 402 and 404 may each receive raw data associated with a plurality of product packages, basis data and rank-order constraints data, and/or the like from server 408 via a network 406. Conversely, server 408 may receive raw data associated with a plurality of product packages, basis data and rank-order constraints data, and/or the like from computer 402 and/or computer 404 via network 406. It is understood that this information may enable computer 402, server 408 and/or computer 404 to perform in accordance with an embodiment (e.g., flowchart 100 or flowchart 300) of the present invention.

Within networking environment 400, server 408 and computers 402 and 404 may be coupled in order to communicate. Specifically, server 408 and computers 402 and 404 are communicatively coupled to network 406. It is appreciated that server 408 and computers 402 and 404 may each be communicatively coupled to network 406 via wired and/or wireless communication technologies.

The network 406 of networking environment 400 may be implemented in a wide variety of ways in accordance with the present embodiment. For example, network 406 may be implemented to include, but is not limited to, a local area network (LAN), a metropolitan area network (MAN), a wide area network (WAN) and/or the Internet. It is noted that networking environment 400 is well suited to be implemented without network 406. As such, server 408 and computers 402 and 404 may be communicatively coupled via wired and/or wireless communication technologies.

Within FIG. 4, it is understood that networking environment 400 may be implemented to include more or less computers than the two computers (e.g., 402 and 404) shown. Additionally, networking environment 400 may be implemented to include more or less server devices than the one server device (e.g., 408) shown. It is noted that server 408 and computer 402 and 404 may each be implemented in a manner similar to a computer system 500 of FIG. 5 described herein. However, these devices of networking environment 400 are not strictly limited to such an implementation.

Exemplary Hardware in Accordance with the Present Invention

Figure 5:
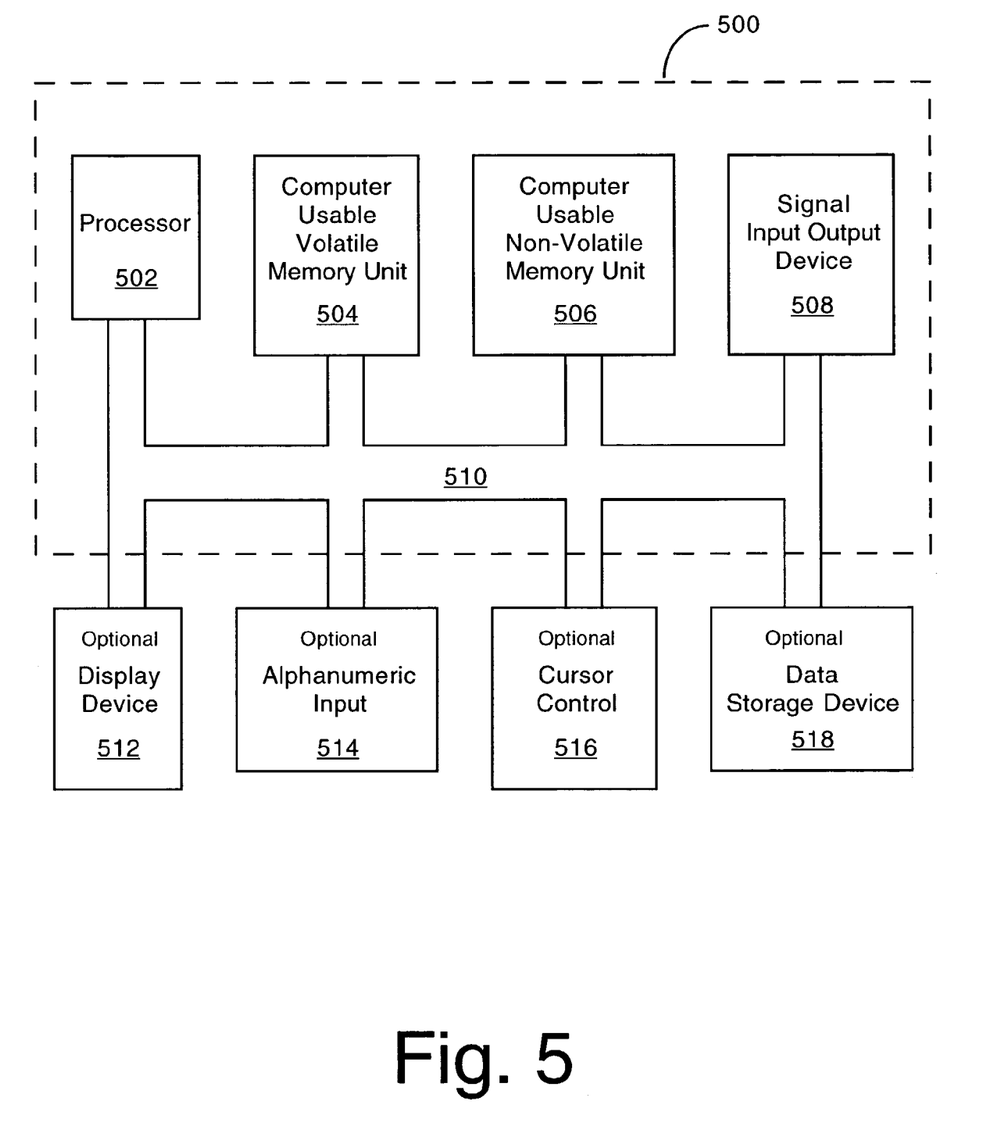
FIG. 5 is a block diagram of an exemplary computer system that may be used in accordance with embodiments of the present invention.

FIG. 5 is a block diagram of an exemplary computer system 500 that may be used in accordance with embodiments of the present invention. It is understood that system 500 is not strictly limited to be a computer system. As such, system 500 of the present embodiment is well suited to be any type of computing system (e.g., server computer, desktop computer, laptop computer, portable computing device, etc.). Within the discussions herein, certain processes and steps were-discussed that may be realized, in some embodiments, as a series of instructions (e.g., software program) that reside within computer readable memory units of computer system 500 and executed by a processor(s) of system 500. When executed, the instructions cause computer 500 to perform specific actions and exhibit specific behavior which is described herein.

Computer system 500 of FIG. 5 comprises an address/data bus 510 for communicating information, one or more central processors 502 coupled with bus 510 for processing information and instructions. Central processor unit(s) 502 may be a microprocessor or any other type of processor. The computer 500 also includes data storage features such as a computer usable volatile memory unit 504, e.g., random access memory (RAM), static RAM, dynamic RAM, etc., coupled with bus 510 for storing information and instructions for central processor(s) 502, a computer usable non-volatile memory unit 506, e.g., read only memory (ROM), programmable ROM, flash memory, erasable programmable read only memory (EPROM), electrically erasable programmable read only memory (EEPROM), etc., coupled with bus 510 for storing static information and instructions for processor(s) 502.

System 500 also includes one or more signal generating and receiving devices 508 coupled with bus 510 for enabling system 500 to interface with other electronic devices. The communication interface(s) 508 of the present embodiment may include wired and/or wireless communication technology. For example, in one embodiment of the present invention, the communication interface 508 is a serial communication port, but could also alternatively be any of a number of well known communication standards and protocols, e.g., a Universal Serial Bus (USB), an Ethernet adapter, a FireWire (IEEE 1394) interface, a parallel port, a small computer system interface (SCSI) bus interface, an infrared (IR) communication port, a Bluetooth wireless communication adapter, a broadband connection, and the like. In another embodiment a digital subscriber line (DSL) connection may be employed. In such a case the communication interface(s) 508 may include a DSL modem. It is understood that the communication interface(s) 508 may provide a communication interface to the Internet.

Optionally, computer system 500 can include an alphanumeric input device 514 including alphanumeric and function keys coupled to the bus 510 for communicating information and command selections to the central processor(s) 502. The computer 500 can also include an optional cursor control or cursor directing device 516 coupled to the bus 510 for communicating user input information and command selections to the central processor(s) 502. The cursor directing device 516 can be implemented using a number of well known devices such as a mouse, a track ball, a track pad, an optical tracking device, a touch screen, etc. Alternatively, it is appreciated that a cursor can be directed and/or activated via input from the alphanumeric input device 514 using special keys and key sequence commands. The present embodiment is also well suited to directing a cursor by other means such as, for example, voice commands.

The system 500 of FIG. 5 can also include a computer usable mass data storage device 518 such as a magnetic or optical disk and disk drive (e.g., hard drive or floppy diskette) coupled with bus 510 for storing information and instructions. An optional display device 512 is coupled to bus 510 of system 500 for displaying video and/or graphics. It should be appreciated that optional display device 512 may be a cathode ray tube (CRT), flat panel liquid crystal display (LCD), field emission display (FED), plasma display or any other display device suitable for displaying video and/or graphic images and alphanumeric characters recognizable to a user.

Accordingly, embodiments of the present invention can obtain or extract the implied component prices of computer systems without producing counterintuitive results, without being time consuming and costly to implement.

The foregoing descriptions of specific embodiments of the present invention have been presented for purposes of illustration and description. They are not intended to be exhaustive or to limit the invention to the precise forms disclosed, and it is evident that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of estimating a value of a component associated with a plurality of product packages, said method comprising:

receiving data associated with said plurality of product packages, said data comprising product package price data associated with said plurality of product packages;

using a computer for processing said data utilizing a mathematical optimization to produce first output data;

using a computer for processing said first output data with a statistical regression to produce second output data; and estimating a value of said component based on said second output data.

2. The method as described in claim 1 wherein said data further comprises a rank order associated with said component.

3. The method as described in claim 1 wherein said data further comprises a comparison basis associated with said component.

4. The method as described in claim 1 wherein said further comprises a priori knowledge associated with said component.

5. The method as described in claim 1 wherein each product package from among said plurality of product packages comprises a plurality of components.

6. The method as described in claim 1 further comprising:

modifying said first output data before said processing said first output data with said statistical regression.

7. The method as described in claim 6 wherein said modifying said first output data comprises combining two variables of said first output data when said two variables are equal.

8. The method as described in claim 1 wherein said mathematical optimization comprises a quadratic optimization linear constraints.

9. The method as described in claim 1 wherein said statistical regression comprises an ordinary squares (OLS) regression.

10. A system for estimating a value of a component associated with a plurality of product packages, said system comprising:

means for accepting data associated with said plurality of product packages, said data comprising product package price data associated with said plurality of product packages;

means for performing a mathematical optimization on said data to produce first output data;

means for performing a statistical regression on said first output data to produce second output data comprising an estimated value; and means for estimating a value of said component based on said second output data.

11. The system as described in claim 10 wherein said further comprises a rank order associated with said component.

12. The system as described in claim 10 wherein said data further comprises a comparison basis associated with said component.

13. The system as described in claim 10 wherein said data further comprises a priori knowledge known before said mathematical optimization is performed by said means for performing said mathematical optimization on said data.

14. The system as described in claim 10 wherein each product package from among said plurality of product packages comprises a plurality of components.

15. The system as described in claim 10 further comprising:

means for modifying said first output data before said statistical regression is performed on said first output data.

16. The system as described in claim 15 wherein said means for modifying said first output data comprises means for combining two variables of said first output data when said two variables are equal.

17. The system as described in claim 10 wherein said mathematical optimization comprises a quadratic optimization with linear constraints.

18. The system as described in claim 10 wherein said statistical regression comprises an ordinary least squares (OLS) regression.

19. A computer readable medium having computer readable code embodied therein when executed by said computer performs a method of estimating a value of a component associated with a plurality of product packages, said method comprising:

receiving data associated with said plurality of product packages, said data comprising product package price data associated with said plurality of product packages;

performing a mathematical optimization with said data to produce first output data;

performing a statistical regression with said first output data to produce second output data; and estimating a value of a component associated with said plurality of product packages based on said second output data.

20. The computer readable medium as described in claim 19 wherein said data further comprises a rank order associated with said component.

21. The computer readable medium as described in claim 19 wherein said data further comprises a comparison basis associated with said component.

22. The computer readable medium as described in claim 19 wherein said data further comprises a priori knowledge known before said performing said mathematical optimization with said data.

23. The computer readable medium as described in claim 19 wherein each product package from among said plurality of product packages comprises a plurality of components.

24. The computer readable medium as described in claim 19 further comprising:

modifying said first output data before said performing said statistical regression with said first output data.

25. The computer readable medium as described in claim 24 wherein said modifying said first output data comprises combining two variables of said first output data when said two variables are equal.

26. The computer readable medium as described in claim 19 wherein said mathematical optimization comprises a quadratic optimization with linear constraints.

27. The computer readable medium as described in claim 19 wherein said statistical regression comprises an ordinary least squares (OLS) regression.

* * * * *

UNITED STATES PATENT AND TRADEMARK OFFICE
CERTIFICATE OF CORRECTION

PATENT NO.       : 7,624,035 B2                                    Page 1 of 1
APPLICATION NO.  : 10/360451
DATED            : November 24, 2009
INVENTOR(S)      : Alex X. Zhang et al.

It is certified that error appears in the above-identified patent and that said Letters Patent is hereby corrected as shown below:

In column 10, line 42, in Claim 4, after "said" insert -- data --.

In column 10, line 56, in Claim 8, after "optimization" insert -- with --.

In column 10, line 59, in Claim 9, after "ordinary" insert -- least --.

In column 11, line 8, in Claim 11, after "said" insert -- data --.

Signed and Sealed this

Sixteenth Day of March, 2010

David J. Kappos
*Director of the United States Patent and Trademark Office*